(12) United States Patent
Dong

(10) Patent No.: US 9,118,359 B2
(45) Date of Patent: Aug. 25, 2015

(54) WIRELESS COMMUNICATION DEVICE WITH EXTENDABLE ROD ANTENNA

(71) Applicants: SHENZHEN FUTAIHONG PRECISION INDUSTRY CO., LTD., Shenzhen (CN); Chi Mei Communication Systems, Inc., New Taipei (TW)

(72) Inventor: Hang Dong, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 118 days.

(21) Appl. No.: 13/711,654

(22) Filed: Dec. 12, 2012

(65) Prior Publication Data

US 2013/0258916 A1  Oct. 3, 2013

(30) Foreign Application Priority Data

Mar. 30, 2012 (CN) .......................... 201210089727.2

(51) Int. Cl.
| | |
|---|---|
| *H04H 20/67* | (2008.01) |
| *H04B 1/00* | (2006.01) |
| *G01S 19/35* | (2010.01) |
| *G01S 19/00* | (2010.01) |
| *G01S 19/13* | (2010.01) |

(52) U.S. Cl.
CPC .............. *H04B 1/0057* (2013.01); *G01S 19/00* (2013.01); *G01S 19/13* (2013.01); *G01S 19/35* (2013.01)

(58) Field of Classification Search
None
See application file for complete search history.

(56) References Cited

U.S. PATENT DOCUMENTS

| | | | | |
|---|---|---|---|---|
| 6,115,605 | A  * | 9/2000 | Siccardo et al. | 455/426.1 |
| 6,266,018 | B1 * | 7/2001 | Otomo | 343/702 |
| 6,400,416 | B1 * | 6/2002 | Tomasz | 348/654 |
| 2003/0085837 | A1 * | 5/2003 | Abraham | 342/357.1 |
| 2005/0245228 | A1 * | 11/2005 | Candal et al. | 455/347 |
| 2007/0072577 | A1 * | 3/2007 | Rozenblit et al. | 455/333 |
| 2008/0055172 | A1 * | 3/2008 | Chen | 343/729 |
| 2010/0321128 | A1 * | 12/2010 | Merlin | 333/112 |

* cited by examiner

*Primary Examiner* — Christopher Crutchfield
(74) *Attorney, Agent, or Firm* — Novak Druce Connolly Bove + Quigg LLP

(57) ABSTRACT

A wireless communication device includes a body, an antenna, a first baseband microchip, a second baseband microchip, and a diplexer. The antenna is telescopically assembled to the body to receive a first wireless signal and a second wireless signal. The diplexer is electronically connected to the antenna, the first baseband microchip, and the second baseband microchip. When the antenna is in a retracted state, the antenna receives the first wireless signal, and the diplexer transmits the first wireless signal to the first baseband microchip. When the antenna is in an extended state, the antenna receives the second wireless signal, and the diplexer transmits the second wireless signal to the second baseband microchip.

9 Claims, 2 Drawing Sheets

WIRELESS COMMUNICATION DEVICE WITH EXTENDABLE ROD ANTENNA

BACKGROUND

1. Technical Field

The disclosure generally relates to wireless communication devices, and particularly to a wireless communication device with an extendable rod antenna.

2. Description of the Related Art

Wireless communication devices, such as mobile phones, and personal digital assistants (PDA), often utilize mounted antennas for receiving/sending wireless signals. Many wireless communication devices may receive/send wireless signals of two frequencies, thus, requiring the presence of two antennas. However, because the two antennas may occupy a lot of space within the devices, it is not conducive to miniaturization of the mobile terminal and increasing design cost.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

Figure 1:
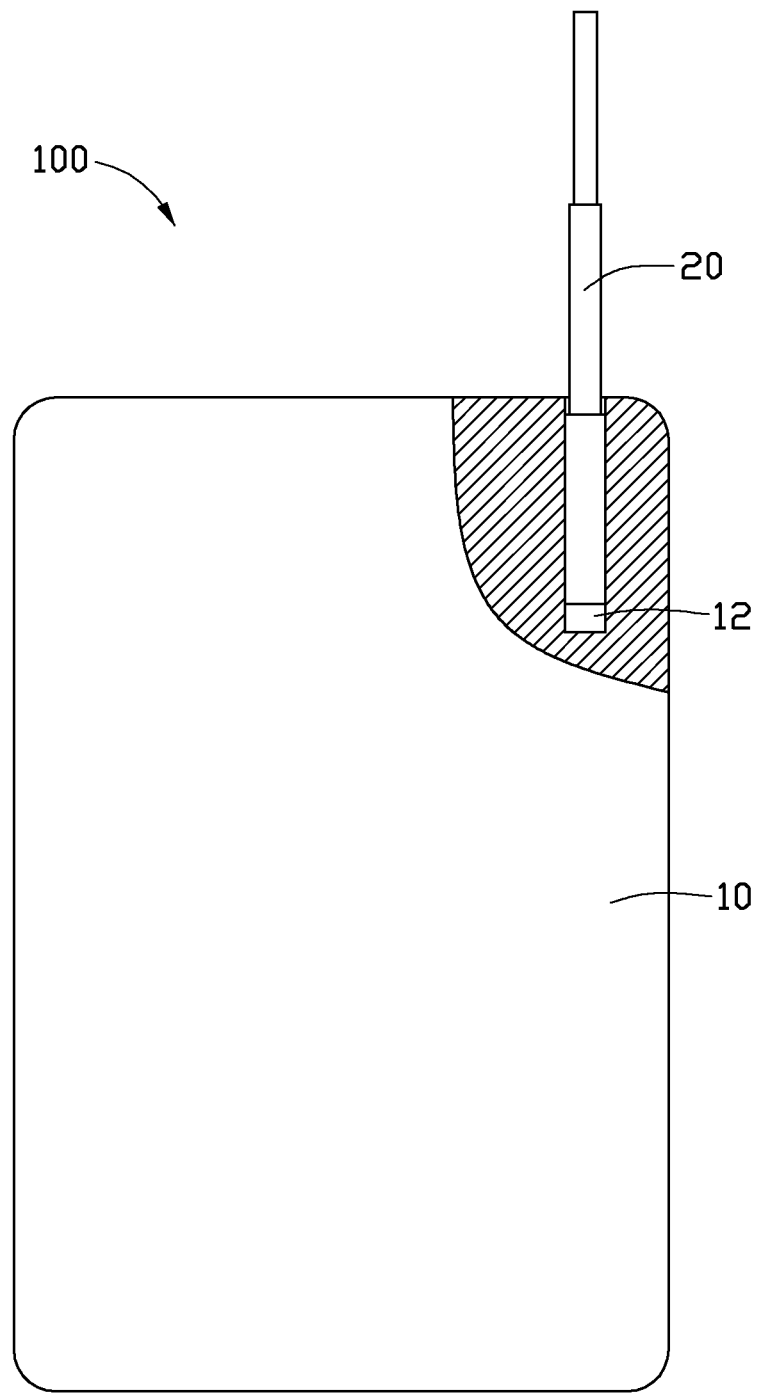
FIG. 1 is a schematic view of a wireless communication device, according to an exemplary embodiment.
Figure 2:
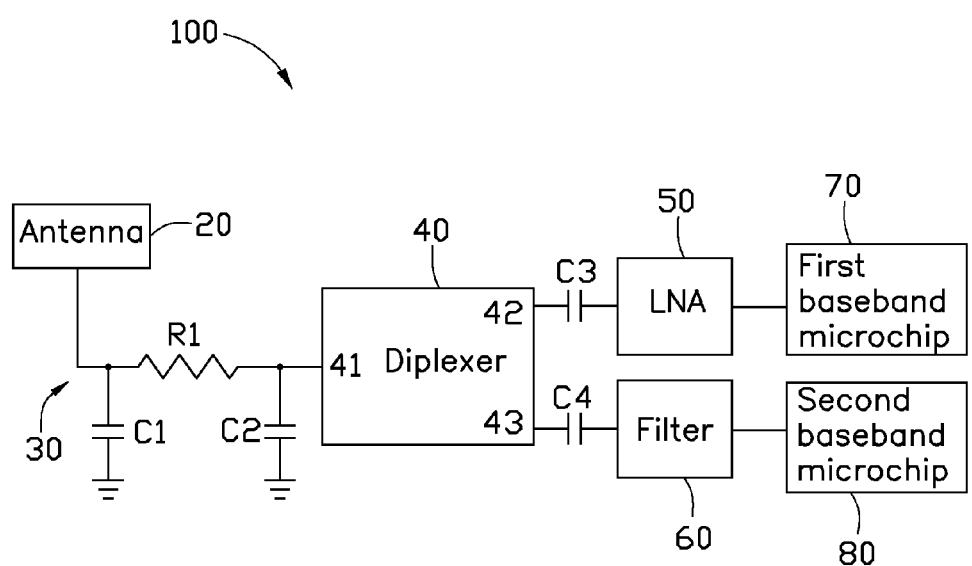
FIG. 2 is a block diagram illustrating the wireless communication device as shown in FIG. 1.

FIGS. 1-2 show a wireless communication device 100 of one embodiment. The wireless communication device 100 can be a mobile phone, or a personal digital assistant (PDA).

The wireless communication device 100 includes a body 10, an antenna 20, a matching circuit 30, a diplexer 40, a low noise amplifier (LNA) 50, a filter 60, a first baseband microchip 70, and a second baseband microchip 80.

The body 10 defines a receiving groove 12 to accommodate the antenna 20. The matching circuit 30, the diplexer 40, the LNA 50, the filter 60, the first baseband microchip 70, and the second baseband microchip 80 are all received and integrated within the body 10.

The antenna 20 is a telescopic antenna, and can be telescopically accommodated in the receiving groove 12 through a slide mechanism (not shown). The antenna 20 can receive/send a first wireless signal having a high frequency and a second wireless signal having a low frequency by adjusting a length of the antenna 20. In one exemplary embodiment, the antenna 20 includes at least three sections. In one example, if the three sections of the antenna 20 are in a retracted state, and are simultaneously received in the receiving groove 12, the length of the antenna 20 is about 48 mm, which is substantially equal to a ¼ wavelength of global position system (GPS) signal. Thus, the antenna 20 can receive/send the first wireless signal (GPS signal) at frequencies of about 1.57 GHz-1.58 GHz. If the three sections of the antenna 20 are in an extended state, and are exposed from the receiving groove 12, the length of the antenna 20 is about 150 mm, which is substantially equal to a ¼ wavelength of television (TV) signal. Thus, the antenna 20 can receive/send the second wireless signal (TV signal) at frequencies of about 470 MHz-806 MHz.

The matching circuit 30 is electronically connected to the antenna 20, and is configured to match an impedance of the antenna 20, where many relevant parameters (e.g., voltage standing wave ratio (VSWR) and return loss) of the antenna 20 can be adjusted. In one exemplary embodiment, the matching circuit includes a resistor R1, a first capacitor C1, and a second capacitor C2. The resistor R1 is electronically connected between the antenna 20 and the diplexer 40. A first end of the resistor R1 is connected to ground via the first capacitor C1, and a second end of the resistor R2 is connected to ground via the second capacitor C2.

The diplexer 40 is configured to isolate the first wireless signal and the second wireless signal. The diplexer 40 includes an input port 41, a first output port 42, and a second output port 43. The input port 41 is electronically connected to the resistor R1 of the matching circuit 30, to receive the first wireless signal and the second wireless signal. The first output port 42 is electronically connected to the LNA 50 via a third capacitor C3 to output the first wireless signal to the LNA 50. The second output port 43 is electronically connected to the filter 60 via a fourth capacitor C4 to output the second wireless signal to the filter 60. The first output port 42 and the second output 43 are isolated from each other to respectively receive/send the first wireless signal and the second wireless signal, thus, signal interference can be avoided.

The LNA 50 can be a linear amplifier and is electronically connected to the first baseband microchip 70. The LNA amplifies the first wireless signal, and transmits the amplified first wireless signal to the first baseband microchip 70. In one exemplary embodiment, the first baseband microchip 70 is a digital signal processor (DSP). The first baseband microchip 70 decodes the first wireless signal into relevant data, such as GPS navigation messages, for example.

The filter 60 is electronically connected to the second baseband microchip 80, the second wireless signal is filtered by the filter 60, and then is transmitted to the second baseband microchip 80. In one exemplary embodiment, the second baseband microchip 80 is a digital signal processor (DSP). The second baseband microchip 80 decodes the second wireless signal into relevant data, such as TV images, for example.

If the first wireless signal having a high frequency (e.g., GPS signal) needs to be received, the three sections of the antenna 20 are retracted in the retracted state, and then the antenna 20 is received in the receiving groove 12. Thus, the antenna 20 receives the first wireless signal, and the first wireless signal is transmitted to the diplexer 40 via the matching circuit 30. The first output port 42 of the diplexer 40 outputs the first wireless signal to the LNA 50, the LNA 50 amplifies the first wireless signal, and then the first baseband microchip 70 decodes the first wireless signal to obtain GPS navigation messages.

If the second wireless having a low frequency (e.g., TV signal) needs to be received, the three sections of the antenna 20 are extended in the extended state, and then the antenna 20 is exposed from the receiving groove 12. Thus, the antenna 20 receives the second wireless signal, and the second wireless signal is transmitted to the diplexer 40 via the matching circuit 30. The second output port 43 of the diplexer 40 outputs the second wireless signal to the filter 60, the filter 60 filters the second wireless signal, and then the second baseband microchip 80 decodes the second wireless signal to obtain TV images.

In summary, the wireless communication device 100 employs the telescopic antenna 20 to receive the first and second wireless signals, and respectively outputs the first and second wireless signals via the diplexer 40. Thus, the wireless communication device 100 does not need two antennas to receive two wireless signals, it is conducive to the miniaturization of the mobile terminal, and the wireless communication device 100 is also low in cost.

Although numerous characteristics and advantages of the exemplary embodiments have been set forth in the foregoing description, together with details of the structures and functions of the exemplary embodiments, the disclosure is illustrative only, and changes may be made in detail, especially in the matters of arrangement of parts within the principles of disclosure to the full extent indicated by the broad general meaning of the terms in which the appended claims are expressed.

What is claimed is:

1. A wireless communication device, comprising:
   a body;
   an antenna telescopically assembled to the body to receive a first wireless signal and a second wireless signal;
   a matching circuit comprising a first capacitor and a second capacitor;
   a first baseband microchip;
   a second baseband microchip;
   a diplexer electronically connected to the antenna, the first baseband microchip, and the second baseband microchip;
   a low noise amplifier (LNA) electronically connected to the diplexer via a third capacitor; and
   a filter electronically connected to the diplexer via a fourth capacitor, and electronically isolated from the LNA;
   wherein when the antenna is in a retracted state, the antenna receives the first wireless signal, and the diplexer transmits the first wireless signal to the first baseband microchip via the third capacitor and the LNA; when the antenna is in an extended state, the antenna receives the second wireless signal, and the diplexer transmits the second wireless signal to the second baseband microchip via the fourth capacitor and the filter.

2. The wireless communication device as claimed in claim 1, wherein the antenna is a telescopic antenna.

3. The wireless communication device as claimed in claim 1, wherein the body defines a receiving groove, and the antenna is telescopically accommodated in the receiving groove.

4. The wireless communication device as claimed in claim 1, wherein the diplexer includes an input port, a first output port, and a second output port, the input port is electronically connected to the antenna to receive the first wireless signal and the second wireless signal, the first output port outputs the first wireless signal, and the second output port outputs the second wireless signal.

5. The wireless communication device as claimed in claim 4, further comprising a matching circuit further including a resistor, wherein the resistor is electronically connected between the antenna and the input port of the diplexer, a first end of the resistor is connected to ground via the first capacitor, and a second end of the resistor is connected to ground via the second capacitor.

6. The wireless communication device as claimed in claim 4, wherein a first end of the LNA is electronically connected to the first output port of the diplexer via the third capacitor and a second end of the LNA is electronically connected to the first baseband microchip to amplify the first wireless signal.

7. The wireless communication device as claimed in claim 4, wherein a first end of the filter is electronically connected to the second output port of the diplexer via the fourth capacitor and a second end of the filter is electronically connected to the second baseband microchip to filter the second wireless signal.

8. The wireless communication device as claimed in claim 1, wherein the first wireless signal is a global position system (GPS) signal, the first baseband microchip is a digital signal processor (DSP) to decode the first wireless signal into GPS navigation messages.

9. The wireless communication device as claimed in claim 1, wherein the second wireless signal is a television (TV) signal, the second baseband microchip is a DSP to decode the second wireless signal into TV images.

* * * * *